Figure 1:
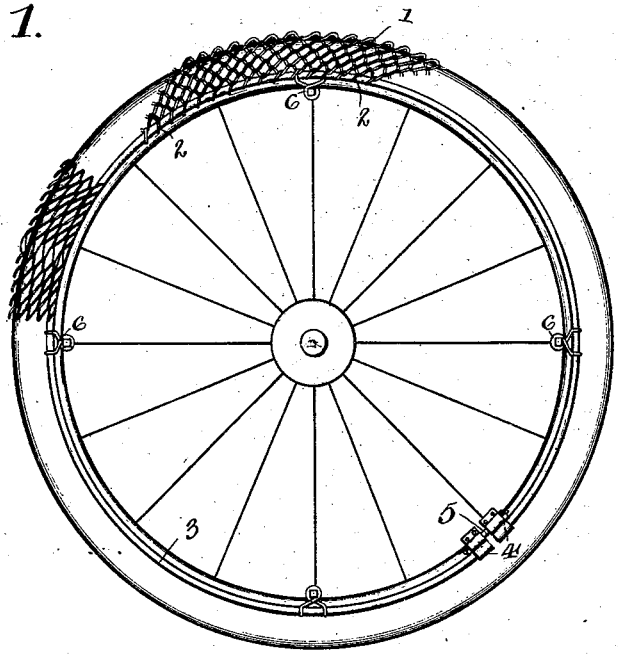

(No Model.)

J. H. LOWREY.
PNEUMATIC TIRE SHIELD.

No. 567,245.   Patented Sept. 8, 1896.

Inventor
J. H. Lowrey,
By his Attorneys,
C. A. Snow & Co.

Witnesses
Chas. A. Ford.
R. M. Smith.

UNITED STATES PATENT OFFICE.

JOSEPH H. LOWREY, OF NEOLA, IOWA.

PNEUMATIC-TIRE SHIELD.

SPECIFICATION forming part of Letters Patent No. 567,245, dated September 8, 1896.

Application filed July 31, 1895. Serial No. 557,701. (No model.)

*To all whom it may concern:*

Be it known that I, JOSEPH H. LOWREY, a citizen of the United States, residing at Neola, in the county of Pottawattamie and State of Iowa, have invented a new and useful Pneumatic-Tire Shield, of which the following is a specification.

This invention relates to an improvement in protectors or shields for pneumatic tires, and has for its object to provide a simple and efficient construction of shield or cover that may be readily applied to any pneumatic-tired wheel, which will serve to effectually prevent the puncturing of said tire, that will operate as the bearing-surface or tread of the tire, and which will yield readily so as to be compressed at the point of impact in such manner as to close the interstices of the material of which the shield or protector is formed, thereby obviating the liability to puncture or otherwise abrade the outer case or cover of the pneumatic tire.

The invention also has for its object to construct the shield or protector in such manner as to form a corrugated or channeled bearing-surface, in order to prevent side slipping; and the invention further contemplates means for removably securing a woven-wire shield or protector to a wheel by means of contractile hoops, whereby the device, as a whole, may be easily applied to rims and tires already in use without necessitating any changes in their construction.

In order to accomplish the objects above mentioned, the invention consists in an improved flexible shield or protector embodying certain novel features and details of construction and arrangement of parts, as hereinafter particularly described, illustrated in the drawings, and finally pointed out in the claim.

Figure 2:
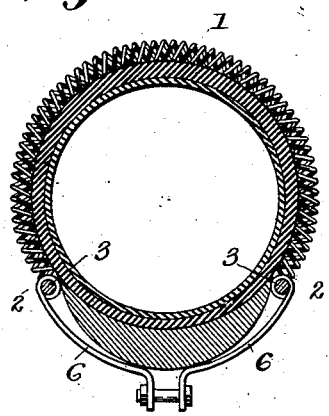
Figure 3:
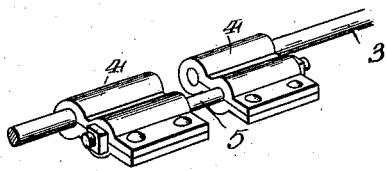
Figure 4:
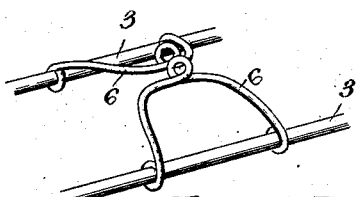

In the accompanying drawings, Figure 1 is a side elevation of a bicycle-wheel, illustrating the application of the improved shield or protector to the pneumatic tire thereof. Fig. 2 is a transverse vertical section through the tire and rim and also through the shield, showing the transversely-disposed clamps for holding the side hoops together. Fig. 3 is an enlarged detail perspective view showing the manner of connecting the adjacent extremities of the side hoops. Fig. 4 is a similar view of the transversely-disposed clamps.

Similar numerals of reference designate corresponding parts in the several figures of the drawings.

Referring to the accompanying drawings, 1 designates a section of the flexible shield or protector, which is preferably of light steel wire so woven as to form a wire fabric or cloth, being preferably composed of a series of transversely-disposed coils passing circumferentially around the wheel, interwoven in such manner as to form a semitubular envelop in which the transverse coils are arranged in alternate sizes so as to present a corrugated or channeled surface or tread to said shield. This semitubular covering is held at its base edges, and the central portion or tread thereof is formed by longitudinal coils, which gradually increase in length as the apex of the covering is approached. This construction enables the shield or protector to be stretched or distended so as to conform to the outer surface of the outer case or cover of the tire when the latter is inflated. It will be observed that the transversely-extending coils form alternate projections and channels at regular intervals in longitudinal section, and that the projections will momentarily and successively flatten or yield by impact of the revolving wheel with the ground, thus effectually protecting the tread portion and the entire outer surface of the outer case or cover from the action of edged stones, &c. By means of the particular construction and arrangement of the flexible woven-wire shield the adhesion of the bearing-surface of the tire is greatly increased and, as a result, there will be considerably less side slipping in wet or slippery weather and in turning corners suddenly.

The flexible sheath or protector above described is held in place by securing the base edges or portions 2 thereof to an oppositely-disposed pair of continuous twin hoops 3, which are arranged in parallel relation to each other upon opposite sides of the wheel-rim, upon which they are adapted to bear. The adjacent extremities of each of said side hoops has secured thereto an eye-plate 4, and a threaded connecting rod or pin 5 is passed through the eyes of said plates and receives upon its opposite ends suitable adjusting-nuts 5 for regulating the diameter of said hoops for the purpose of stretching the woven-wire shield or covering firmly and closely around the tire.

6 designates a series of separable connecting links or clamps, which are made in oppositely-disposed pairs and secured to their respective hoops. These clamps are made to conform to the convexity of the inner face of the rim, each of said clamps being preferably formed from a single piece of wire, the terminals of which are looped around its respective hoop, and the central portion of which is bent to form an eye. The eyes of an opposite pair of these clamps receive and are connected by a threaded bolt, by means of which the clamps may be drawn together, thus increasing the tension uniformly on the shield, which of course is free to stretch laterally to a certain extent. This peculiar form of link affords an efficient means for drawing taut the shield and circling the tire and also acts to press the hoops against the inner surface of the wheel-rim. Any number of these transverse clamps may be employed according to the desire of the manufacturer.

From the foregoing description it will be apparent that a very effective shield or protector is formed, which may be easily and quickly applied around a pneumatic tire and as quickly removed when desired. When in place it will effectually obviate all liability of the said tire to puncture, and instead of restricting or interfering with the resilient action of the tire it will operate to increase such resiliency. By reason of the aforesaid corrugations or channels in the tread-surface of such woven-wire covering the liability of the wheel to slip laterally or circumferentially upon smooth or slippery surfaces will be to a great extent overcome.

It will be apparent that any kind of woven-wire fabric or cloth may be employed and that the coils may be extended longitudinally or diagonally instead of transversely, if desired, and that the mesh of such fabric or cloth may be increased or diminished according to the desire of the manufacturer, it being preferable, however, to use a fabric of comparatively fine mesh, as this will more effectively prevent sharp objects from injuring the tire or puncturing the same.

It will also be apparent that other changes in the form, proportion, and minor details of construction may be resorted to without departing from the spirit or sacrificing any of the advantages of this invention.

The transverse disposition of the coils is preferred, as they will not stretch and the meeting ends of the shield can be much easier laced, and broken coils can be replaced in a comparatively short time and at a nominal cost, and greater elasticity is attained, as the distention of the pneumatic tire is laterally as the wheel revolves. The pneumatic tire frequently becomes displaced, thereby endangering the life and the limbs of the rider, and this is obviated by the present invention, as the shield serves to hold the tire in place should it have a tendency to slip, as will be readily understood. Should the shield be too long for a given tire, it can be quickly shortened by removing a number of the transverse coils and shortening the hoops proportionately.

Having thus described the invention, what is claimed as new, and desired to be secured by Letters Patent, is—

A removable shield for pneumatic tires composed of flexible armor, an oppositely-disposed pair of twin hoops affixed to the opposite or base edges of said shield, and a series of laterally-disposed clamps for securing said hoops, substantially as and for the purpose specified.

In testimony that I claim the foregoing as my own I have hereto affixed my signature in the presence of two witnesses.

JOSEPH H. LOWREY.

Witnesses:
C. M. CRIPPEN,
J. S. HUMSEN.